US012650494B2

(12) United States Patent
Robertson, Jr. et al.

(10) Patent No.: US 12,650,494 B2
(45) Date of Patent: Jun. 9, 2026

(54) SENSOR ASSEMBLY

(71) Applicant: Ford Global Technologies, LLC, Dearborn, MI (US)

(72) Inventors: Michael Robertson, Jr., Garden City, MI (US); Venkatesh Krishnan, Canton, MI (US); Tyler Hamilton, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 410 days.

(21) Appl. No.: 18/322,800

(22) Filed: May 24, 2023

(65) Prior Publication Data

US 2024/0393436 A1 Nov. 28, 2024

(51) Int. Cl.
| | |
|---|---|
| *G01S 7/481* | (2006.01) |
| *B60R 11/00* | (2006.01) |
| *B60R 11/04* | (2006.01) |
| *F16L 55/28* | (2006.01) |
| *F16L 101/30* | (2006.01) |
| *G01M 3/00* | (2006.01) |
| *G01N 29/22* | (2006.01) |
| *G01N 29/265* | (2006.01) |

(52) U.S. Cl.
CPC ............ *G01S 7/4813* (2013.01); *B60R 11/04* (2013.01); *B60R 2011/004* (2013.01); *B60R 2011/0061* (2013.01); *F16L 55/28* (2013.01); *F16L 2101/30* (2013.01); *G01M 3/005* (2013.01); *G01N 29/225* (2013.01); *G01N 29/265* (2013.01)

(58) Field of Classification Search
CPC . G01S 7/4813; B60R 11/04; B60R 2011/004; B60R 2011/0061; G01M 3/005; G01N 29/265; G01N 29/225; F16L 55/28

USPC .......................................................... 73/865.8
See application file for complete search history.

(56) References Cited

U.S. PATENT DOCUMENTS

| | | | | |
|---|---|---|---|---|
| 6,223,467 B1 * | 5/2001 | Mahalek | ............... | E05F 15/443 |
| | | | | 49/27 |
| 10,549,679 B1 * | 2/2020 | Ekladyous | ............... | B60Q 1/44 |
| 11,285,880 B2 * | 3/2022 | Exline | ....................... | B60R 3/02 |

(Continued)

FOREIGN PATENT DOCUMENTS

| | | | |
|---|---|---|---|
| CN | 205193272 U | * | 4/2016 |
| CN | 207992435 U | * | 10/2018 |

(Continued)

OTHER PUBLICATIONS

Hanno Holzhüter et al., Technical concepts of automotive LiDAR sensors: a review, Optical Engineering, vol. 62(3), Mar. 2023, p. 34 (Year: 2023).*

(Continued)

*Primary Examiner* — Stephanie E Bloss
*Assistant Examiner* — Kevin C Butler
(74) *Attorney, Agent, or Firm* — Frank A. MacKenzie; Brooks Kushman P.C.

(57) ABSTRACT

A sensor assembly includes a fixed vehicle structure and a vehicle panel that is movable relative to the fixed vehicle structure between an open position and a closed position. The sensor assembly additionally includes a bracket mounted to the movable vehicle panel, a sensor mounted to the bracket, and a first pin that is actuatable to fix the bracket to the fixed vehicle structure when the movable vehicle panel is in the closed position.

20 Claims, 6 Drawing Sheets

100

(56) References Cited

U.S. PATENT DOCUMENTS

| | | | | |
|---|---|---|---|---|
| 11,571,773 B1 * | 2/2023 | Robertson, Jr. | ......... | B23P 19/10 |
| 11,597,335 B1 * | 3/2023 | Shaffer | .................. | B60R 13/04 |
| 12,092,260 B2 * | 9/2024 | Kim | ........................ | G01S 7/027 |
| 12,172,701 B2 * | 12/2024 | Serizawa | ............. | B62D 25/163 |
| 2012/0161454 A1 * | 6/2012 | Muramatsu | ............. | E05B 77/36 |
| | | | | 292/141 |
| 2021/0031692 A1 * | 2/2021 | Ning | ........................ | B60R 1/06 |
| 2021/0207399 A1 * | 7/2021 | Piirainen | .............. | H01F 7/0221 |
| 2022/0266810 A1 * | 8/2022 | Loch | ..................... | B60T 17/221 |
| 2022/0314913 A1 * | 10/2022 | Aoyama | ................ | B60R 19/24 |
| 2024/0393436 A1 * | 11/2024 | Robertson, Jr. | ......... | B60R 11/04 |

FOREIGN PATENT DOCUMENTS

| | | | | | | |
|---|---|---|---|---|---|---|
| CN | 216034218 | U | * | 3/2022 | | |
| CN | 218453355 | U | * | 2/2023 | | |
| CN | 116868297 | A | * | 10/2023 | ............. | G08B 21/18 |
| DE | 102008044840 | A1 | * | 3/2010 | ............. | B60S 1/0881 |
| DE | 102020110129 | A1 | * | 10/2020 | ............. | B60N 3/026 |
| DE | 102024113847 | A1 | * | 11/2024 | ............. | B60R 11/00 |
| HU | 231289 | B1 | * | 8/2022 | ............. | E05B 77/28 |
| JP | 2025074507 | A | * | 5/2025 | | |
| KR | 20220112779 | A | * | 8/2022 | ......... | E05B 47/0002 |
| WO | WO-2012010363 | A1 | * | 1/2012 | .............. | G10K 9/22 |
| WO | WO-2015040154 | A1 | * | 3/2015 | ......... | E05B 47/0004 |
| WO | WO-2021232271 | A1 | * | 11/2021 | ............. | B60R 11/00 |

OTHER PUBLICATIONS

Holzhüter et al., "Technical concepts of automotive LiDAR sensors: a review", Optical Engineering, Mar. 2023 ) vol. 62(3).

* cited by examiner

600

SENSOR ASSEMBLY

BACKGROUND

Autonomous and semi-autonomous vehicles typically include a variety of sensors. Some sensors detect the position or orientation of the vehicle, for example, global positioning system (GPS) sensors; accelerometers, such as piezo-electric or microelectromechanical systems (MEMS); gyroscopes such as rate, ring laser, or fiber-optic gyroscopes; inertial measurement units (IMU); and magnetometers. Some sensors detect objects external to a vehicle, for example, radar sensors, scanning laser range finders, light detection and ranging (lidar) devices, and image processing sensors such as cameras. A sensor fusion technique may be utilized to combine output data from multiple sensors, which can provide an enhanced driving experience by providing a more thorough assessment of a driving environment.

DETAILED DESCRIPTION

Figure 1:
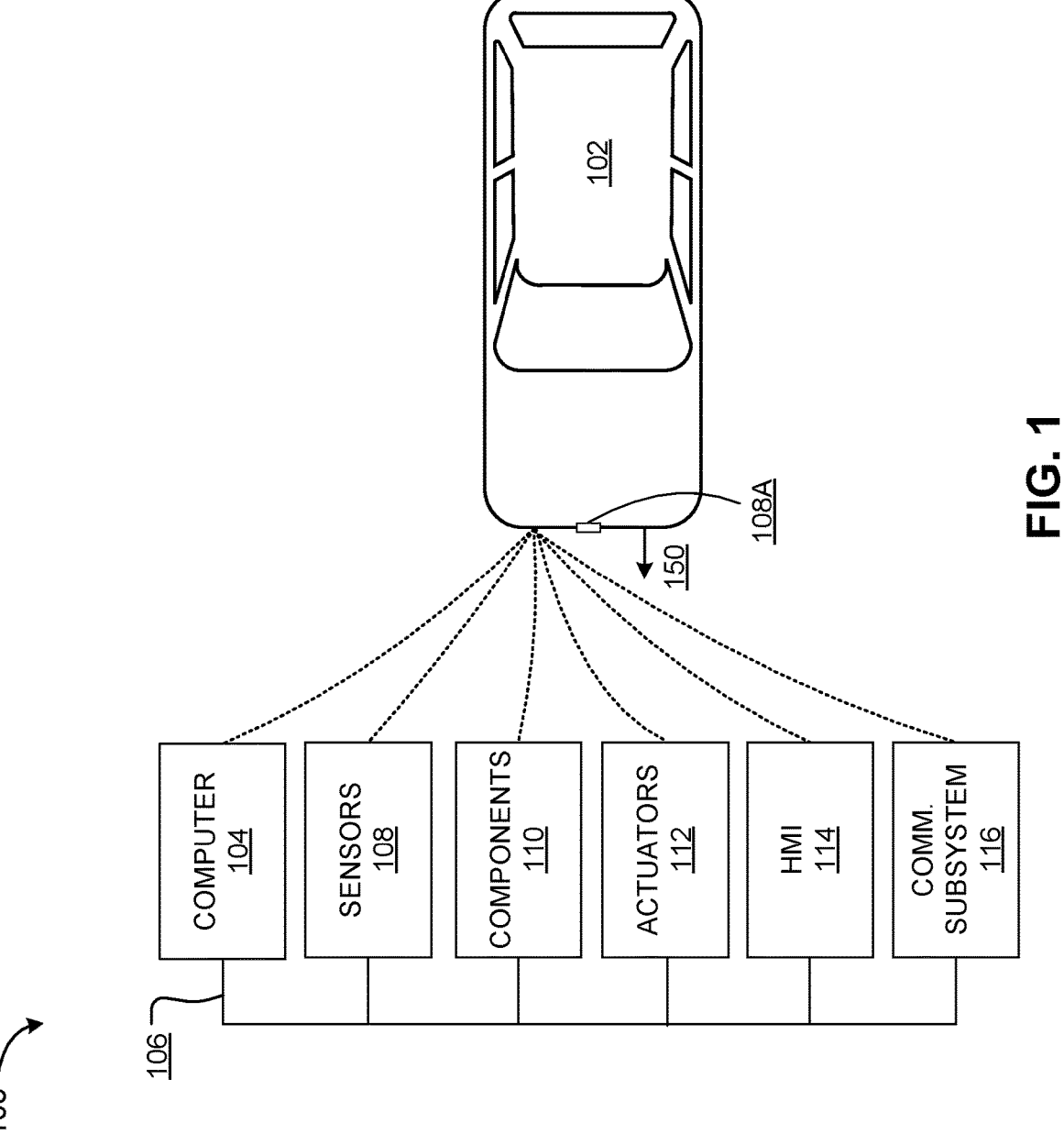
FIG. 1 is a block diagram of an example vehicle.

A sensor assembly can include a fixed vehicle structure and a vehicle panel that is movable between an open position and a closed position relative to the fixed vehicle structure. The bracket can be mounted to the movable vehicle panel, and a sensor can be mounted to the bracket. A first pin can be actuatable to fix the bracket to the fixed vehicle structure when the movable vehicle panel is in the closed position.

The sensor assembly can additionally include a first electromechanical switch mounted to the fixed vehicle structure and positioned to apply a force to the first actuatable pin.

The sensor assembly can additionally include a first electromechanical switch, mounted to the fixed vehicle structure, and positioned to apply a force to engage the first actuatable pin into a first receptacle of the bracket.

The sensor assembly can additionally include a first electromechanical switch mounted to the fixed vehicle structure and positioned to engage the first actuatable pin into a first receptacle of the bracket responsive to the vehicle being placed into an operating mode.

The sensor assembly can additionally include a first electromechanical switch mounted to the fixed vehicle structure and can be positioned to disengage the first actuatable pin from a first receptacle of the bracket responsive to the vehicle being placed into a nonoperating mode.

The sensor assembly can additionally include a first attachment bracket fixed to the movable vehicle panel and a first sleeve, fixed to and surrounding a first end portion of the bracket, having a first spring coupler positioned to couple to the first attachment bracket fixed to the movable vehicle panel.

The sensor assembly can additionally include a first sleeve, fixed to and surrounding a first end portion of the bracket, having a first spring coupler to couple to the bracket, the first end portion of the bracket can include a first receptacle positioned to receive the first actuatable pin.

The sensor assembly can additionally include a first sleeve, fixed to and surrounding a first end portion of the bracket, having a first spring coupler to couple to a first attachment bracket fixed to the movable vehicle panel, the first spring coupler can include at least one spring having a spring constant sufficient to support a combined weight of the sensor assembly of between 3.5 kilograms and 8.0 kilograms without binding the first actuatable pin to the first sleeve.

The sensor assembly can additionally include a first sleeve, fixed to and surrounding a first end portion of the bracket, having a first spring coupler to couple to a first attachment bracket fixed to the movable vehicle panel, the first spring coupler including a first plurality of springs, a first one of the first plurality of springs being oriented at a substantially right-angle increment from a second one of the first plurality of springs with respect to a center axis of the bracket.

The sensor assembly can additionally include a first sleeve that is fixed to and surrounding first and second receptacles positioned at a first end portion of the bracket, the first and second receptacles to receive the first actuatable pin and a second actuatable pin, the first sleeve having a first spring coupler to couple to a first attachment bracket fixed to the movable vehicle panel, the first spring coupler including a first plurality of springs. The sensor assembly can additionally include a second sleeve, having a second spring coupler to couple to the bracket, positioned to surround a second end portion of the bracket, the second end portion of the bracket having a third receptacle positioned to receive a third actuatable pin to fix the bracket to the fixed vehicle structure when the movable vehicle panel is placed in the closed position.

The sensor assembly can additionally include a first sleeve, fixed to and surrounding first and second receptacles positioned at a first end portion of the bracket, having a first spring coupler to couple to a first attachment bracket fixed to the movable vehicle panel, the first spring coupler including a first plurality of springs and a second sleeve, fixed to and surrounding a second end portion of the bracket, having a second spring coupler to couple to a second attachment bracket fixed to the movable vehicle panel, the second spring coupler including a second plurality of springs, a first one of the second plurality of springs being oriented at substantially right angle increments of a second one of the second plurality of springs with respect to a center axis of the bracket.

The sensor assembly can additionally include a first electromechanical switch mounted to the fixed vehicle structure and positioned to apply a force to the first actuatable pin. The sensor assembly can additionally include a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a second electromechanical switch, mounted to the fixed vehicle structure, to apply a force to the second actuatable pin.

The bracket of the sensor assembly can include a cross-beam bracket that includes a first end portion and a second end portion. The sensor assembly can additionally include a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a third actuatable pin, to fix the bracket to the fixed vehicle structure when the movable vehicle panel is placed in the closed position, positioned to fix the second end portion of the bracket to the fixed vehicle structure when the movable panel is placed in the closed position.

The bracket of the sensor assembly can include a first end portion and a second end portion. The sensor assembly can additionally include a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a third actuatable pin positioned to fix the second end portion of the bracket to the fixed vehicle structure when the movable panel is placed in the closed position and a third electromechanical switch, mounted to the fixed vehicle structure, to apply a force to the third actuatable pin.

The bracket of the sensor assembly can include a first end portion and a second end portion. The sensor assembly can have a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a third actuatable pin positioned to fix the second end portion of the bracket to the fixed vehicle structure when the movable panel is placed in the closed position and a fourth actuatable pin positioned to restrict angular motion of the bracket with respect to a center axis of the fixed vehicle structure when the movable vehicle panel is placed in the closed position.

The sensor of the sensor assembly can be mounted on or over the bracket.

The bracket of the sensor assembly can include a first end portion and a second end portion, and the sensor assembly can further include a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a third actuatable pin positioned to fix the second end portion of the bracket to the fixed vehicle structure when the movable panel is placed in the closed position. The sensor assembly can further include a fourth actuatable pin positioned to restrict angular motion of the bracket with respect to a center axis of the fixed vehicle structure when the movable vehicle panel is placed in the closed position. The sensor can be rigidly mounted over the bracket and constrained in movement with respect to any axis relative to the fixed vehicle structure during operation of the vehicle.

The bracket of the sensor assembly can additionally include a first end portion and a second end portion. The sensor assembly can additionally include a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position. The sensor assembly can additionally include a third actuatable pin positioned to fix the second end portion of the bracket to the fixed vehicle structure when the movable panel is placed in the closed position. The sensor assembly can additionally include a fourth actuatable pin positioned to restrict angular motion of the bracket with respect to a center axis of the fixed vehicle structure when the movable vehicle panel is placed in the closed position, in which the sensor is mounted over the bracket. The sensor can thus be constrained in angular displacement with respect to a center axis of the fixed vehicle structure during operation of the vehicle.

The movable vehicle panel of the sensor assembly can enclose a front cargo compartment of the vehicle.

The movable vehicle panel of the sensor assembly can enclose a front cargo compartment of the vehicle, and the bracket can be positioned above the midpoint of the movable panel.

With reference to the Figures, wherein like numerals indicate like parts throughout the several views, FIG. 1 is a block diagram of an example vehicle 100. Vehicle 100 can include a land vehicle, such as a car, truck, a sport utility vehicle, a crossover, a van, a minivan, a taxi, a bus, etc. Vehicle 100 includes computer 104, which may utilize vehicle communications bus 106 to communicate with sensor set 108, vehicle components 110, actuators 112, human-machine interface (HMI) 114, and communication subsystem 116. Computer 104 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc. Vehicle communications bus 106 can include an internal wired and/or wireless network, such as a controller area network (CAN) or the like, and/or other wired and/or wireless mechanisms. Vehicle computer 104 includes a processor and a memory, which can include one or more forms of computer-readable media, and stores instructions executable by vehicle computer 104 for performing various operations, including those disclosed herein.

Computer 104 may include or be communicatively coupled to more than one processor, e.g., included in electronic controller units (ECUs) or the like included in vehicle 100 for monitoring, actuating, and/or controlling various vehicle actuators 112, e.g., a powertrain actuator, a brake actuator, a steering actuator, electromechanical actuators etc. Further, vehicle computer 104 may receive signals, via communications subsystem 116, from a satellite positioning system, e.g., GPS. As an example, computer 104 may obtain an estimate of the position of vehicle 100, which may include, for example, fusing output data from sensor set 108 with satellite positioning signals from GPS satellites. The location data may be in a known form, e.g., geo-coordinates in a global-reference frame (i.e., latitudinal and longitudinal coordinates).

Sensor set 108 of vehicle 100 can include any sensor for detecting the attributes of an environment external to vehicle 100, such as objects and/or characteristics of surroundings of vehicle 100. Accordingly, sensor set 108 may operate to detect other vehicles, road markings, traffic lights and/or signs, pedestrians, etc. For example, sensor set 108 may include radar sensors, ultrasonic sensors, scanning laser range finders, light detection and ranging (lidar) devices (e.g., lidar sensor 108A), and image processing sensors such as cameras. As shown in FIG. 1, lidar sensor 108A may be positioned at a front portion of vehicle 100 so as to provide detection and ranging of stationary or moving objects in a forward direction of vehicle 100 as the vehicle moves along path 150. Sensor set 108 can include a variety of additional devices, which may be mounted at a top portion of vehicle 100, at a rear portion of vehicle 100, at a front windshield, around vehicle 100, etc. Such sensors may provide relative locations, sizes, and shapes of objects and/or conditions surrounding vehicle body 102. Sensors of sensor set 108 may cooperate with each other to provide sensor fusion capabilities. For example, lidar sensor 108A may cooperate with a camera sensor to provide, for example, a range to a camera-detected object. Thus, in one example, a camera device of sensor set 108 may capture an image of a stationary or moving object located in a forward direction of vehicle 100. Lidar sensor 108A may then provide range data, which may permit sensor fusion processing programming of computer 104 to determine a distance between the camera-detected object and the vehicle.

Actuators 112 are implemented via circuits, chips, indicators (e.g., lamps, audible indicators, haptic indicators), motors (e.g., stepper motors), or other electronic and/or mechanical components that can actuate various vehicle subsystems in accordance with appropriate control signals. For example, actuators 112 may include electromechanical actuators, such as electromechanical switches 410, 411, described in greater detail in reference to FIG. 4A herein.

In the context of the present disclosure, "actuating" or forms thereof, is defined as setting an object into motion via a mechanical or electromechanical stimulus. Thus, for example, and as will be described in greater detail herein, an electromechanical switch, such as electromechanical switch 410 and 411, described in reference to FIG. 4A, operate to apply force to an actuatable pin, such as actuatable pin 420, also described in reference to FIG. 4A, in response to a magnetic field generated via current conduction through coiled conductors of the electromechanical device. Thus, an electromechanical switch can include a solenoid switch, a stepper motor, an electrohydraulic valve, etc.

Vehicle 100 may, for example, include an electric vehicle having electrically-driven motors attached in proximity to the axles of the vehicle. Accordingly, a front portion of vehicle 100, which may be utilized to house an internal-combustion gasoline, diesel, or liquid natural gas engine in an internal-combustion engine (ICE) vehicle, may be available for transporting cargo in an electric vehicle. Such vehicle configurations, as depicted in FIG. 2 herein, may utilize one or more hinge 220 to allow articulation of movable panel 210 from a closed position to an open position.

Vehicle 100 includes body 102. Vehicle 100 may be of a unibody construction, in which a frame and body 102 of vehicle 100 are a single component. Vehicle 100 may, alternatively, be of a body-on-frame construction, in which the frame supports body 102 that is a separate component from the frame. The frame and body 102 may be formed of any suitable material, for example, steel, aluminum, etc.

Figure 2:
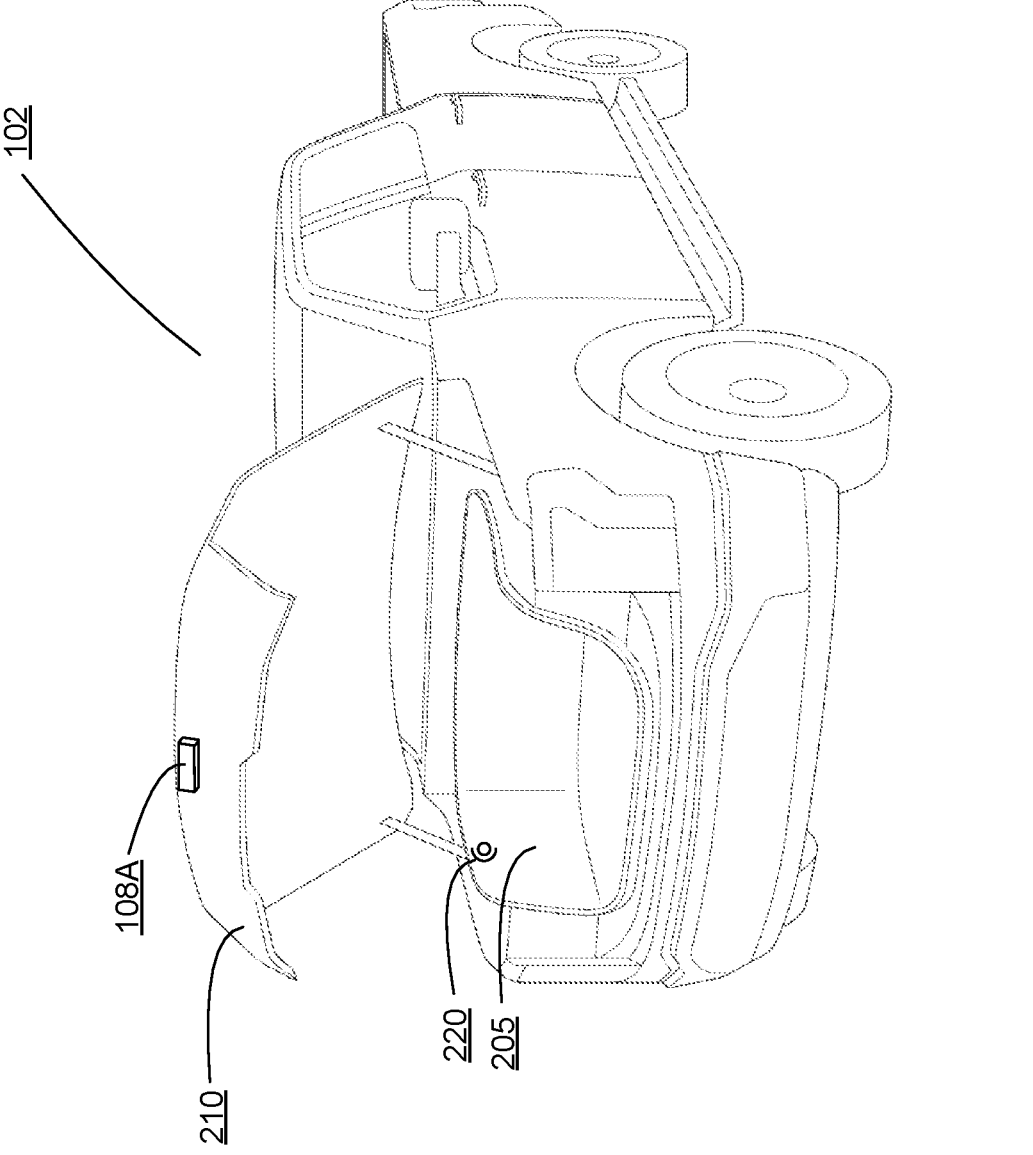
FIG. 2 is a perspective view of an example vehicle having a front cargo compartment.

FIG. 2 shows example vehicle 100 having a front cargo compartment 205. In FIG. 2, movable panel 210 is capable of articulating between a closed position and an open position, such as by way of rotation around hinge 220 attached to body 102 of vehicle 100. In the open position, movable panel 210 reveals front cargo compartment 205, which is available to insert cargo items prior to placing movable panel 210 into the closed position while vehicle 100 is operated. In the closed position, movable panel 210 encloses front cargo compartment 205. FIG. 2 additionally depicts sensor 108A, which may correspond to a lidar sensor for detecting presence of static or moving objects in a direction that is forward of vehicle 100 while the vehicle is in motion. Lidar sensor 108A moves in concert with movable panel 210 as the movable panel is articulated between the open and the closed position.

Figure 3:
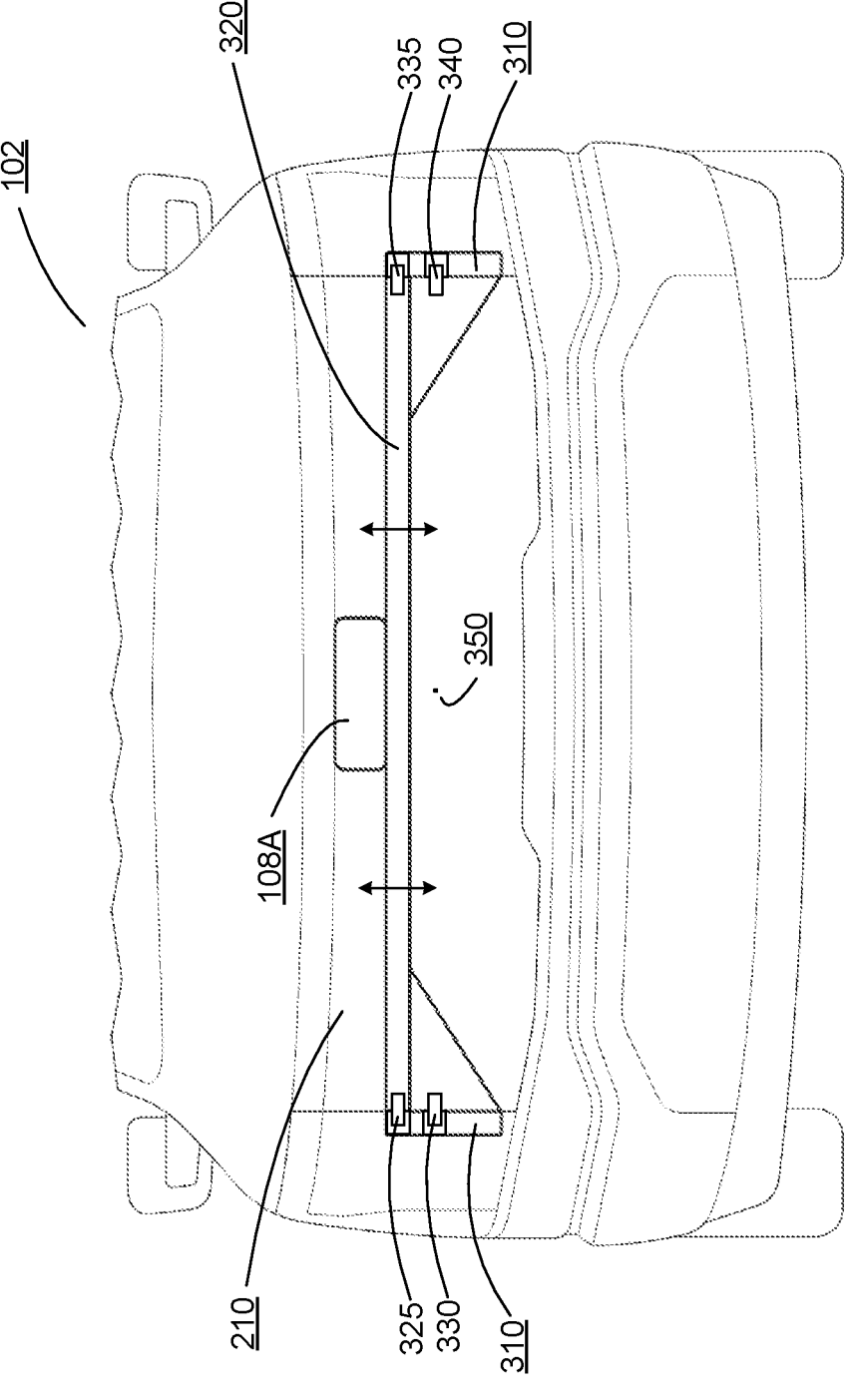
FIG. 3 is a front view of an example vehicle having a sensor assembly.

Accordingly, to prevent or preclude lidar sensor 108A from becoming misaligned with other sensors of sensor set 108, e.g., as movable panel 210 is articulated between an open position and a closed position, lidar sensor may be rigidly fixed to the vehicle body 102. In an example, as described in reference to FIG. 3, responsive to movable panel 210 articulating to a closed position, one or more of actuatable pins, e.g., 325, 330, 335, and 340, which may be positioned proximate to opposing end portions of bracket 320, may be actuated so as to fix movable panel 210 to fixed vehicle structure 310. In the example of FIG. 3, fixed vehicle structure 310 may be securely mounted or integrated with body 102 of vehicle 100. Accordingly, in the example of FIG. 3, relative motion of bracket 320 and lidar sensor 108A may be restrained with respect to body 102. Consequently, lidar sensor 108A may undergo displacement of less than a threshold amount, e.g., 3 mm, 4 mm, 5 mm, 6 mm, etc., with respect to vehicle body 102. Lidar sensor 108A may be additionally restricted from undergoing a threshold of angular displacement, e.g., 2°, 3°, 4°, 5°, etc., with respect to a center axis of vehicle body 102.

FIG. 3 shows vehicle 100 having a sensor assembly. As seen in FIG. 3, movable panel 210 has been placed into the closed position, thereby securing the contents of front cargo compartment 205 of vehicle 100. Lidar sensor 108A is shown as being positioned above midpoint 350 of movable panel 210. Midpoint 350 is located halfway up along a height, i.e., a vertical dimension, of movable panel 210. In such an example, lidar sensor 108A may be capable of detecting objects in a direction that is forward of vehicle 100 as the vehicle proceeds along path 150 while reducing the likelihood of road debris contacting the lidar sensor.

Lidar sensor 108A is mounted on and supported by bracket 320. Bracket 320 may include a cross-beam bracket that is mounted to movable panel 210, so as to move up and down as movable panel 210 articulates between an open position and a closed position. In an example, responsive to movable panel 210 articulating to a closed position, one or more of actuatable pins 325, 330, 335, and 340, which may be positioned proximate to opposing end portions of bracket 320, may be actuated so as to fix bracket 320 to fixed vehicle structure 310. In the example of FIG. 3, fixed vehicle structure 310 may be securely mounted or integrated with the body 102 of vehicle 10000. Accordingly, in the example of FIG. 3, relative motion of bracket 320 and lidar sensor 108A may be restrained with respect to body 102. Consequently, lidar sensor 108A may undergo displacement of less than a threshold amount, e.g., 3 mm, 4 mm, 5 mm, 6 mm, etc., with respect to vehicle body 102. Lidar sensor 108A may be additionally restrained from undergoing a threshold of total angular displacement, e.g., 2°, 3°, 4°, 5°, etc., with respect to a center axis of vehicle body 102.

Figures 4A, 4B:
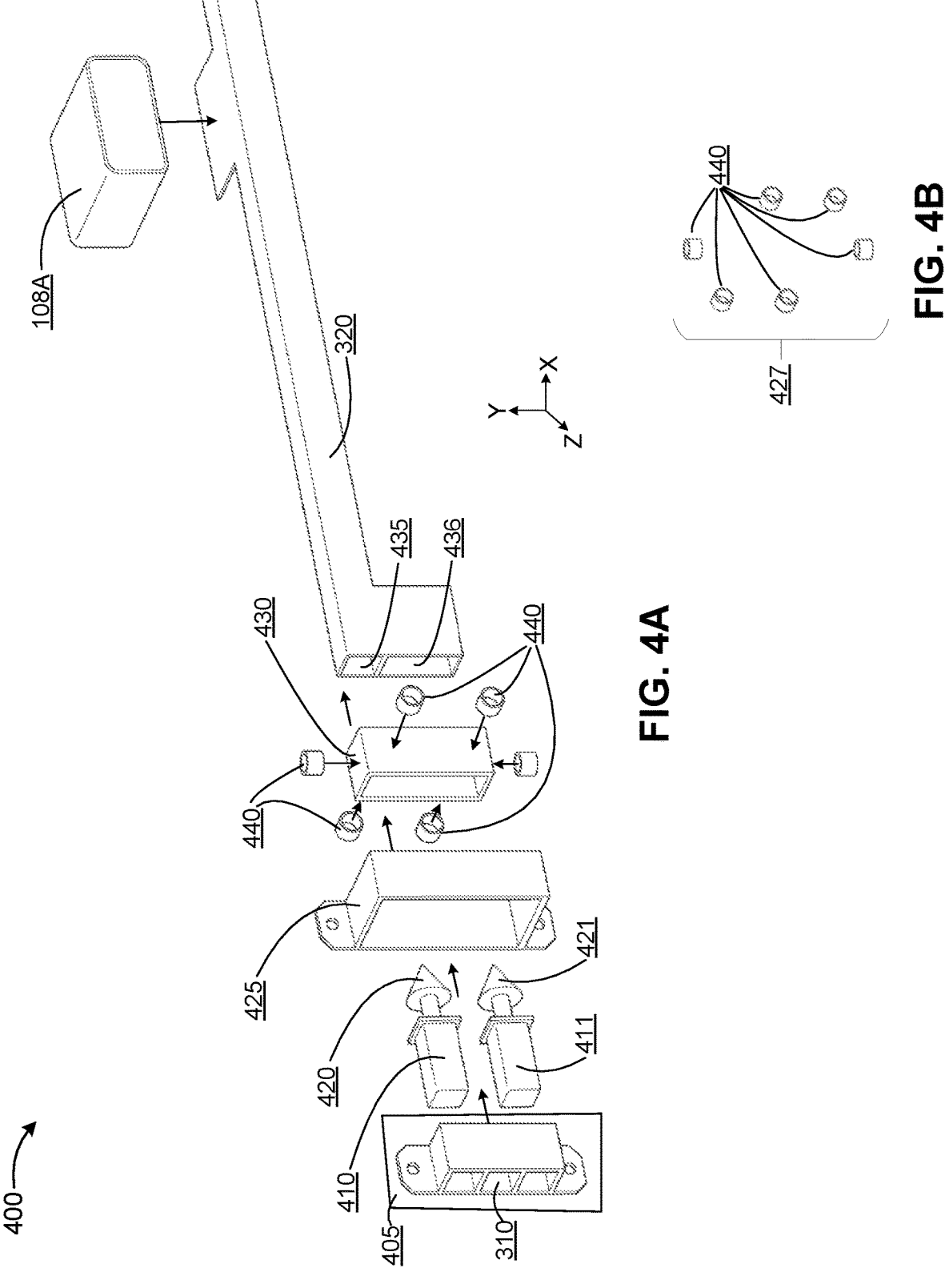
FIG. 4A is an exploded perspective view of a sensor assembly.
FIG. 4B is a perspective view of components of a spring coupler of a sensor assembly.

FIG. 4A is an exploded view of sensor assembly 400 showing a first end portion of bracket 320. The components indicated in FIG. 4A may be replicated at a second end of bracket 320. As described in reference to FIG. 3, bracket 320 can be mounted to movable panel 210. As seen in FIG. 4A, lidar sensor 108A is mounted to bracket 320. Bracket 320 includes receptacles 435 and 436, which may be capable of receiving actuatable pins 420 and 421 (respectively). Bracket 320 may be elongated in a cross-vehicle direction from receptacles 435, 436 at the first end portion to receptacles 435, 436 at the second end portion. Receptacles 435, 436 at each end portion may face in an outboard direction relative to vehicle body 102 and may extend in a cross-vehicle, inboard direction into bracket 320.

Figure 5:
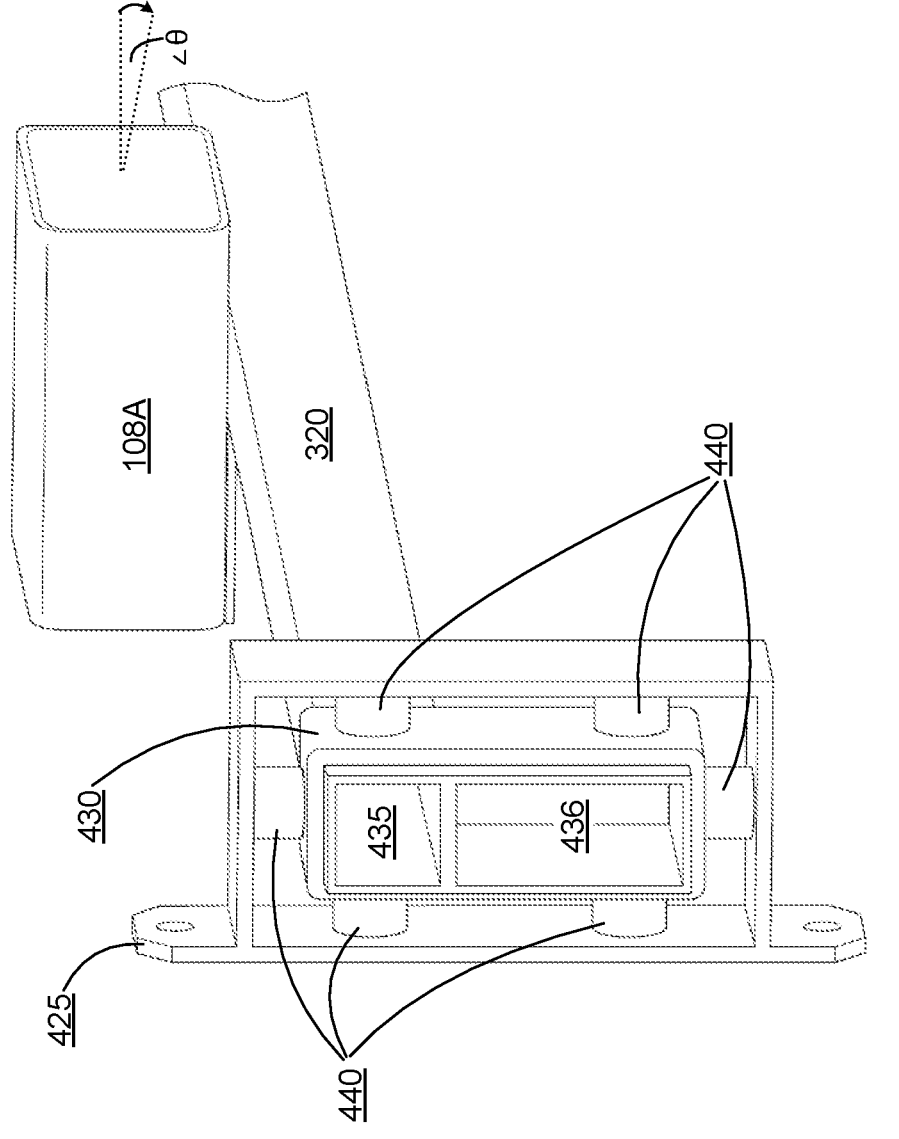
FIG. 5 is a perspective view of a portion of a sensor assembly.

As described in greater detail in reference to FIG. 5, an end portion of bracket 320 may be surrounded by sleeve 430 in which an inner surface of sleeve 430 is positioned to be in contact with an outer surface of the end portion of bracket 320. Sleeve 430 may be rigidly attached to the end portion of bracket 320, e.g., by a press fit. Sleeve 430 may be spring coupled to attachment bracket 425 via springs 440, in which a first end of each of springs 440 may be fixed to an exterior surface of sleeve 430. A second end of each of springs 440 may be fixed to an inner surface of attachment bracket 425. Accordingly, attachment bracket 425 may be spring coupled to sleeve 430 which may permit receptacles 435 and 436 to be displaced by a small amount in relation to attachment bracket 425 to allow receptacles 435 and 436 to receive actuatable pins 420 and 421.

Attachment bracket 425 may extend fully around sleeve 430, e.g., be concentric around sleeve 430, and spaced from sleeve 430 via springs 440. Attachment bracket 425 is fixed relative to movable panel 210 (shown in FIGS. 2-3). For example, attachment bracket 425 may be bolted to movable panel 210.

As shown in FIG. 4B, springs 440 may be collectively referred to as spring coupler 427. In the context of this disclosure, a spring coupler is defined as a device for joining 2 or more structural elements together utilizing one or more springs or another type of resilient components. Accordingly, for the example of FIG. 4A, springs 440 of spring coupler 427 operate to resiliently join an exterior surface of sleeve 430 with an inner surface of attachment bracket 425. Springs 440 of spring coupler 427 may include springs having a spring constant of between 17 kg/cm to 90 kg/cm. In an example, for a weight of bracket 320 of 2 kg, and a weight of lidar sensor 108A of 2.5 kg, each of springs 440 of spring coupler 427 having a spring constant of between 17 kg/cm and 90 kg/cm can form a spring coupler capable of supporting and restraining lidar sensor 108A from undergoing displacement, in any axis, of between 4 mm and 6 mm. In addition, springs 440 of spring coupler 427 having a spring constant of between 17 kg/cm and 90 kg/cm can restrain lidar sensor 108A from undergoing total angular displacement about a center axis of vehicle body 102 of between 2° and 5°. Side-facing springs 440 of spring coupler 427 may be oriented at right angle increments from top-facing springs 440.

Actuatable pins 420 and 421 may be connected to electromechanical switches 410 and 411, respectively. Accordingly, an electric current conducted through electromechanical switch 410 can generate a force sufficient to drive actuatable pin 420 into receptacle 435. Similarly, an electric current conducted through electromechanical switch 411 can generate a force sufficient to drive actuatable pin 421 into receptacle 436. Further, the positions of receptacles 435 and 436 may be adjusted, via spring coupler 427, to receive actuatable pins 420, 421 without binding inner surfaces of receptacles 435 and 436 to the corresponding actuatable pin 420, 421 upon insertion or removal of the actuatable pin 420, 421 to the receptacle 435, 436. In the example of FIG. 4A, electromechanical switches 410, 411 can be rigidly mounted to fixed vehicle structure 310, which may, in turn, be mounted to frame member 405 of body 102.

FIG. 5 shows details of a sensor assembly 500. As seen in FIG. 5, an inner surface of attachment bracket 425 is fixed to first ends of springs 440. Second ends of springs 440 are fixed to an outer surface of sleeve 430. An inner surface of sleeve 430 surrounds an end portion of bracket 320. In the example of FIG. 5, spring coupling of attachment bracket 425 to sleeve 430, permits receptacles 435 and 436 to be adjusted in position so as to accommodate insertion and removal of actuatable pins 420 and 425.

The components identified in FIG. 5 can be replicated at an opposite (or second) end of bracket 320, so as to fix the opposite (or second) end of bracket 320 to a fixed vehicle structure (e.g., fixed vehicle structure 310) via actuatable pins 335 and 340 shown in FIG. 3. For example, the components may be symmetrical about a centerline of vehicle body 102. Accordingly, at a second end of bracket 320, a second sleeve, similar to sleeve 430, may be positioned to surround the second end portion of bracket 320. The second end of bracket 320 may include a third receptacle to receive third actuatable pin 335 and a fourth receptacle to receive fourth actuatable pin 340. Third actuatable pins 335 and 340 may be actuated via the third and fourth electromechanical switches similar to electromechanical switches 410 and 411. The second end of bracket 320 may include a second spring coupler similar to spring coupler 427, which may utilize springs similar to springs 440, to adjust the positions of receptacles to receive actuatable pins 335 and 340. At the second end of bracket 320, a spring coupler similar to spring coupler 427 may couple the second sleeve to a second attachment bracket, similar to attachment bracket 425. Third and fourth electromechanical switches, similar to electromechanical switches 410 and 411, can be rigidly mounted to fixed vehicle structure 310, which may, in turn, be mounted to frame member 405 of vehicle body 102.

Figure 6:
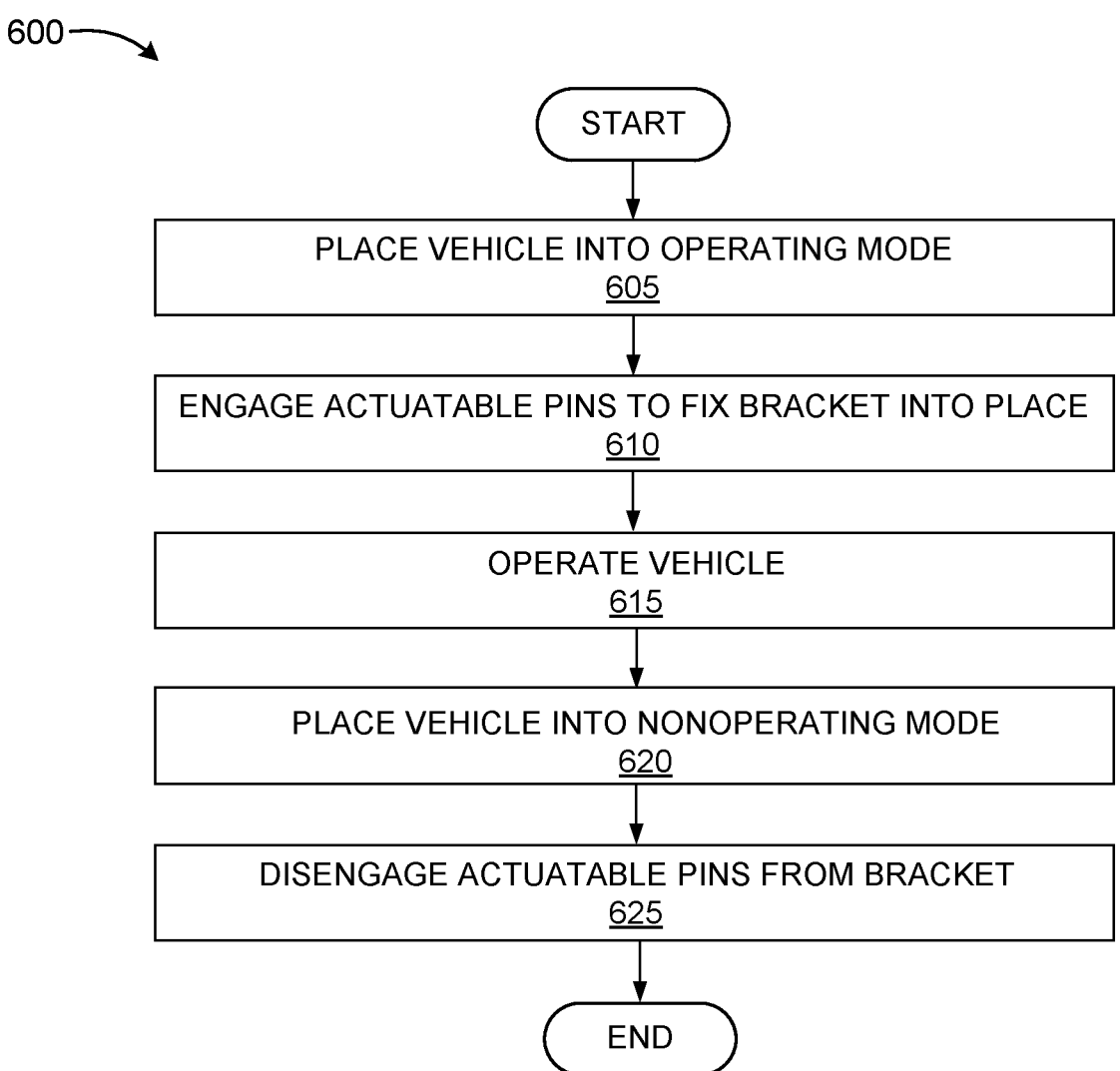
FIG. 6 is a flowchart of an example process for operating a sensor assembly.

FIG. 6 is a flowchart of an example process 600 for operating a sensor assembly. The process 600 can be performed via programming of computer 104, which may operate to fix bracket 320 and lidar sensor 108A to fixed vehicle structure 310 after placing front cargo compartment 205 into a closed position. Process 600 can then be initiated in response to vehicle 100 being placed into an operating mode, e.g., activating a propulsion control of vehicle 100, deactivating a parking brake of vehicle 100, etc. In response to placing vehicle 100 into an operating mode, programming of computer 104 can output a signal, which controls an electric current conducted through electromechanical switches (e.g., 410, 411). Conduction of an electric current through the electromechanical switches proximate with first and second ends of bracket 320 can operate to force actuatable pins 325, 330, 335, 340 positioned proximate with first and second ends of bracket 320 into corresponding receptacles (e.g., 435, 436) of bracket 320. In response to insertion of actuatable pins 325, 330, 335, 340 into first and second ends of bracket 320, lidar sensor 108A may be restrained from being displaced in any axis (e.g., X, Y, Z axes) by less than a threshold amount, such as an amount between 2 mm and 6 mm, etc. with respect to vehicle body 102. Insertion of actuatable pins 325, 330, 335, 340 may additionally limit the total angular displacement of lidar sensor 108A with respect to a center axis of vehicle body 102 by a threshold amount, such as between 2° and 5°. Accordingly, programming of computer 104 may be capable of combining or fusing output data from lidar sensor 108A with parameters extracted from other sensors of sensor set 108, e.g., a camera, of vehicle 100. In an example, actuatable pins 325, 330, 335, 340 may remain inserted into receptacles (e.g., 435, 436) of bracket 320 while vehicle 100 is operational.

Process 600 begins at block 605, in which programming of computer 104 receives output data indicating that vehicle 100 has been placed into an operating mode. An operating mode may include release of a parking brake of vehicle 100, placing the vehicle into a mode that brings about propulsion of the vehicle, e.g., shifting from park to drive, for example.

Process 600 may continue at block 610, in which computer 104 outputs a signal which controls an electric current conducted through electromechanical switches (e.g., 410, 411). In response to conduction of electrical current through the electromechanical switches, actuatable pins 325, 330, 335, 340 can be forced into an appropriate receptacle (e.g., 435, 436) of bracket 320, thereby fixing the bracket to fixed vehicle structure 310.

Process 600 may continue at block 615, in which vehicle 100 may be operated under the control of an operator, which may include a human, in response to vehicle 100 operating in a manual mode. Alternatively, one or more functions of vehicle 100 may be operated by computer 104, in response to vehicle 100 operating in an autonomous or semi-autonomous mode. While vehicle 100 is being operated, actuatable pins 325, 330, 335, 340 may remain inserted into an appropriate receptacle (e.g., 435, 436) to maintain bracket 320 fixed to fixed vehicle structure 310.

Process 600 may continue at block 620, in which computer 104 may determine that vehicle 100 has been placed into a nonoperating mode, which may include an operator setting a parking brake of the vehicle, turning vehicle 100 off, removing a key from a key receptacle of the vehicle 100, etc.

Process 600 may continue at block 625, in which, in response to computer 104 determining that vehicle 100 is presently in a nonoperating mode, computer 104 may terminate current conduction through one or more electromechanical switches (e.g., 410, 411), which may permit actuatable pins 325, 330, 335, 340 to disengage from receptacles of bracket 320 (e.g., 435, 436). In response to the actuatable pins disengaging from corresponding receptacles, an operator, for example, may permit front cargo compartment 205 to be opened, such as by an operator of vehicle 100.

After block 625, process 600 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly, comprising:
a fixed vehicle structure;
a vehicle panel that is movable relative to the fixed vehicle structure between an open position and a closed position;
a bracket mounted to the movable vehicle panel;
a sensor mounted to the bracket; and
a first pin that is actuatable to fix the bracket to the fixed vehicle structure when the movable vehicle panel is in the closed position.

2. The sensor assembly of claim 1, further comprising:
a first electromechanical switch mounted to the fixed vehicle structure and positioned to apply a force to the first actuatable pin.

3. The sensor assembly of claim 1, further comprising:
a first electromechanical switch, mounted to the fixed vehicle structure, and positioned to apply a force to engage the first actuatable pin into a first receptacle of the bracket.

4. The sensor assembly of claim 1, further comprising:
a first electromechanical switch mounted to the fixed vehicle structure and positioned to engage the first actuatable pin into a first receptacle of the bracket responsive to the vehicle being placed into an operating mode.

5. The sensor assembly of claim 1, further comprising:
a first electromechanical switch mounted to the fixed vehicle structure and positioned to disengage the first actuatable pin from a first receptacle of the bracket responsive to the vehicle being placed into a nonoperating mode.

6. The sensor assembly of claim 1, further comprising:
a first attachment bracket fixed to the movable vehicle panel; and
a first sleeve, fixed to and surrounding a first end portion of the bracket, having a first spring coupler positioned to couple to the first attachment bracket fixed to the movable vehicle panel.

7. The sensor assembly of claim 1, further comprising:
a first sleeve, fixed to and surrounding a first end portion of the bracket, having a first spring coupler to couple to the bracket, the first end portion of the bracket including a first receptacle positioned to receive the first actuatable pin.

8. The sensor assembly of claim 1, further comprising:
a first sleeve, fixed to and surrounding a first end portion of the bracket, having a first spring coupler to couple to a first attachment bracket fixed to the movable vehicle panel, the first spring coupler including at least one spring having a spring constant sufficient to support a combined weight of the sensor assembly of between 3.5 kilograms and 8.0 kilograms without binding the first actuatable pin to the first sleeve.

9. The sensor assembly of claim 1, further comprising:
a first sleeve, fixed to and surrounding a first end portion of the bracket, having a first spring coupler to couple to a first attachment bracket fixed to the movable vehicle panel, the first spring coupler including a first plurality of springs, a first one of the first plurality of springs being oriented at a substantially right-angle increment from a second one of the first plurality of springs with respect to a center axis of the bracket.

10. The sensor assembly of claim 1, further comprising:
a first sleeve that is fixed to and surrounding first and second receptacles positioned at a first end portion of the bracket, the first and second receptacles to receive the first actuatable pin and a second actuatable pin, the first sleeve having a first spring coupler to couple to a first attachment bracket fixed to the movable vehicle panel, the first spring coupler including a first plurality of springs; and
a second sleeve, having a second spring coupler to couple to the bracket, positioned to surround a second end portion of the bracket, the second end portion of the bracket having a third receptacle positioned to receive a third actuatable pin to fix the bracket to the fixed vehicle structure when the movable vehicle panel is placed in the closed position.

11. The sensor assembly of claim 1, further comprising:
a first sleeve, fixed to and surrounding first and second receptacles positioned at a first end portion of the bracket, having a first spring coupler to couple to a first attachment bracket fixed to the movable vehicle panel, the first spring coupler including a first plurality of springs; and
a second sleeve, fixed to and surrounding a second end portion of the bracket, having a second spring coupler to couple to a second attachment bracket fixed to the movable vehicle panel, the second spring coupler including a second plurality of springs, a first one of the second plurality of springs being oriented at substantially right angle increments of a second one of the second plurality of springs with respect to a center axis of the bracket.

12. The sensor assembly of claim 1, further comprising:
a first electromechanical switch mounted to the fixed vehicle structure and positioned to apply a force to the first actuatable pin;
a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position; and
a second electromechanical switch, mounted to the fixed vehicle structure, to apply a force to the second actuatable pin.

13. The sensor assembly of claim 1, wherein the bracket includes a cross-beam bracket that includes a first end portion and a second end portion, and wherein the sensor assembly further comprises:

a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position; and a third actuatable pin, to fix the bracket to the fixed vehicle structure when the movable vehicle panel is placed in the closed position, positioned to fix the second end portion of the bracket to the fixed vehicle structure when the movable panel is placed in the closed position.

14. The sensor assembly of claim 1, wherein the bracket includes a first end portion and a second end portion, and wherein the sensor assembly further comprises:

a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position;

a third actuatable pin positioned to fix the second end portion of the bracket to the fixed vehicle structure when the movable panel is placed in the closed position; and a third electromechanical switch, mounted to the fixed vehicle structure, to apply a force to the third actuatable pin.

15. The sensor assembly of claim 1, wherein the bracket includes a first end portion and a second end portion, and wherein the sensor assembly further comprises:

a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position;

a third actuatable pin positioned to fix the second end portion of the bracket to the fixed vehicle structure when the movable panel is placed in the closed position; and a fourth actuatable pin positioned to restrict angular motion of the bracket with respect to a center axis of the fixed vehicle structure when the movable vehicle panel is placed in the closed position.

16. The sensor assembly of claim 1, wherein the sensor is mounted over the bracket.

17. The sensor assembly of claim 1, wherein the bracket includes a first end portion and a second end portion, and wherein the sensor assembly further comprises:

a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position;

a third actuatable pin positioned to fix the second end portion of the bracket to the fixed vehicle structure when the movable panel is placed in the closed position; and a fourth actuatable pin positioned to restrict angular motion of the bracket with respect to a center axis of the fixed vehicle structure when the movable vehicle panel is placed in the closed position, wherein the sensor is rigidly mounted over the bracket and constrained in movement with respect to any axis relative to the fixed vehicle structure during operation of the vehicle.

18. The sensor assembly of claim 1, wherein the bracket includes a first end portion and a second end portion, and wherein the sensor assembly further comprises:

a second actuatable pin, to fix the bracket to the fixed vehicle structure when the movable vehicle panel is placed in the closed position, positioned to restrict angular motion of the bracket with respect to a center axis of the fixed vehicle structure when the movable vehicle panel is placed in the closed position;

a third actuatable pin positioned to fix the second end portion of the bracket to the fixed vehicle structure when the movable panel is placed in the closed position; and a fourth actuatable pin positioned to restrict angular motion of the bracket with respect to a center axis of the fixed vehicle structure when the movable vehicle panel is placed in the closed position, wherein the sensor is mounted over the bracket, and wherein the sensor is to be constrained in angular displacement with respect to a center axis of the fixed vehicle structure during operation of the vehicle.

19. The sensor assembly of claim 1, wherein the movable vehicle panel in the closed position encloses a front cargo compartment of the vehicle.

20. The sensor assembly of claim 1, wherein the movable vehicle panel corresponds to a movable panel of a front cargo compartment of the vehicle, and wherein the bracket is positioned above a midpoint of the movable panel.

* * * * *